United States Patent
Suita

(10) Patent No.: US 7,318,340 B2
(45) Date of Patent: Jan. 15, 2008

(54) VEHICLE POSITIONING APPARATUS

(75) Inventor: Kazutsugu Suita, Nagoya (JP)

(73) Assignee: Toyota Jidosha Kabushiki Kaisha, Aichi (JP)

(*) Notice: Subject to any disclaimer, the term of this patent is extended or adjusted under 35 U.S.C. 154(b) by 127 days.

(21) Appl. No.: 11/264,004

(22) Filed: Nov. 2, 2005

(65) Prior Publication Data

US 2006/0102408 A1 May 18, 2006

(30) Foreign Application Priority Data

Nov. 4, 2004 (JP) .............................. 2004-320792

(51) Int. Cl.
*G01M 17/00* (2006.01)
(52) U.S. Cl. .......................................... 73/117; 73/123
(58) Field of Classification Search .................. 73/669, 73/670, 116, 117, 117.1, 117.2, 121, 122, 73/123, 124, 11.04, 146
See application file for complete search history.

(56) References Cited

U.S. PATENT DOCUMENTS

| | | | |
|---|---|---|---|
| 4,679,327 A | | 7/1987 | Fouchey et al. |
| 4,901,560 A | * | 2/1990 | Hirano et al. .................. 73/117 |
| 4,962,664 A | * | 10/1990 | Hirano et al. ............... 73/118.1 |
| 5,000,038 A | * | 3/1991 | Katt .............................. 73/117 |
| 5,088,320 A | * | 2/1992 | Fukuda et al. ............. 73/118.1 |
| 5,131,267 A | * | 7/1992 | Fukuda et al. ............. 73/118.1 |
| 5,355,586 A | | 10/1994 | Fukuda et al. |
| 5,756,889 A | * | 5/1998 | D'Angelo .................... 73/117 |
| 5,844,145 A | * | 12/1998 | D'Angelo ................. 73/862.18 |
| 6,050,137 A | * | 4/2000 | Merrill, Sr. ................... 73/146 |

FOREIGN PATENT DOCUMENTS

| | | |
|---|---|---|
| GB | 2 315 257 A | 1/1998 |
| JP | 64-035301 | 2/1989 |
| JP | 06-331505 | 12/1994 |

OTHER PUBLICATIONS

European Search Report, Application No. 05256735.1, Aug. 2, 2007, 3 pages.

* cited by examiner

*Primary Examiner*—Eric S. McCall
(74) *Attorney, Agent, or Firm*—Finnegan, Henderson, Farabow, Garrett & Dunner, L.L.P.

(57) ABSTRACT

A vehicle positioning apparatus capable of avoiding the elastic deformation of the tires or the development of histeresis in and around the legs allows a vehicle to be positioned with high accuracy. The apparatus includes two front wheel guide units 10 and two rear wheel guide units 20, each including a pair of guide members g1 and g2 with a predetermined length that extend in parallel while an interval is maintained between the guide members in accordance with the tire widths W1 and W2 of front wheels 51 and the rear wheels 52, respectively, of a vehicle 50 to be positioned. A correct position of the vehicle can be ensured as the vehicle travels along the wheel guide units with each of the tires restrained by each pair of guide members g1 and g2 on either side of the tire. The apparatus also includes a mechanism for adjusting each of the wheel guide units in accordance with the wheel tracks T1 and T2 of the vehicle 50, whereby various types of vehicles can be handled with a single apparatus.

3 Claims, 6 Drawing Sheets

VEHICLE POSITIONING APPARATUS

CROSS REFERENCE TO RELATED APPLICATION

This application is based upon and claims the benefit of priority from prior Japanese Patent Application No. 2004-320792, filed Nov. 4, 2004, the entire contents of which are incorporated herein by reference.

BACKGROUND OF THE INVENTION

1. Field of the Invention

The present invention relates to an apparatus for correctly positioning a vehicle during inspection of positioning of the vehicle.

2. Background Art

When the direction of headlights or the optical axis of a rear-guide monitor or the like of a vehicle are checked, the vehicle must be correctly positioned with respect to a predetermined reference line using a vehicle positioning apparatus. Patent Document 1 discloses an apparatus for evaluating one-sided shifting of vehicles using a vehicle positioning apparatus. In this example of prior art, a vehicle to be inspected is transported to a free table (consisting of a pair of rollers or the like) and stopped thereon. Pressure is then applied to the wheels laterally using pressure rollers or the like so as to displace the wheels to the left or right such that the vehicle can be correctly positioned. In another example, Patent Document 2 discloses an apparatus whereby wheels are disposed on a slidable table that can be horizontally moved freely. The wheels are pressed and clamped on both sides with a pair of clamp members that can be moved towards or away from one another, so that the wheels can be correctly positioned.

Patent Document 1: JP Patent Publication (Kokai) No. 6-331505 A (1994)

Patent Document 2: JP Patent Publication (Kokai) No. 64-35301 A (1989)

SUMMARY OF THE INVENTION

In these conventional vehicle positioning apparatuses, the vehicle (or the wheels thereof) is forcibly pushed or pulled in a stationary state. As a result, elastic deformation or histeresis occurs in and around the legs of the vehicle, making it difficult to achieve accurate positioning. When the wheels are placed on the horizontally movable sliding table as in Patent Document 2, the aforementioned problem can be avoided only to some degree. Conventionally, items of inspection that require correct positioning of the vehicle are typically the direction of headlights and the adjustment of the optical axis of the rear-guide monitor, as mentioned above. As long as these inspection items are concerned, requirements can be sufficiently met using conventional vehicle positioning apparatuses without encountering any particular problems.

However, as more and more vehicles are equipped with increasingly advanced systems, such as a lane-keeping system using millimeter-wave radar, the level of precision required in optical axis adjustment in sensors or the like in such a system is far higher than those in the optical axis adjustment of backlights or rear-guide monitors. Therefore, conventional vehicle positioning apparatuses are not suitable for such high precision optical axis adjustment, and there is a need for a positioning apparatus having higher positioning accuracy.

Another problem associated with the conventional vehicle positioning apparatuses is that, when vehicles with different wheel tracks, tire sizes, or wheelbases are to be positioned with high precision, optimum equipment must be separately provided for each type of vehicle, which would increase the number of components in the apparatus as a whole. Particularly, when the vehicles have different wheelbases, systems such as a hydraulic piston would be required for moving the positioning apparatus at the front and rear in accordance with a particular wheelbase, and the stroke of the piston or the like must also be accommodated.

It is therefore an object of the invention to provide a novel vehicle positioning apparatus capable of positioning various types of vehicles with different wheel tracks, tires sizes, or wheelbases using a single positioning apparatus with higher accuracy.

In one aspect, the invention provides a vehicle positioning apparatus for ensuring a correct position of a vehicle by introducing said vehicle into said apparatus, comprising:

front and rear wheel guide units each comprising a pair of guide members with a predetermined length that extend in parallel on either side of each tire of said vehicle introduced, while an interval is maintained between said guide members in accordance with the width of the tire;

a first position adjusting mechanism for adjusting the interval between each pair of guide members in each wheel guide unit in accordance with the tire width of said vehicle as it is introduced;

a second position adjusting mechanism for adjusting the interval between each pair of said wheel guide units in accordance with the wheel track of said vehicle as it is introduced; and a detection means disposed between said rear wheel guide units and said front wheel guide units for detecting the time at which the front wheels of said vehicle pass said detection means as said vehicle is introduced, wherein the front wheels of said vehicle are introduced into said front wheel guide unit after passing through said rear wheel guide unit, wherein said vehicle is correctly positioned as each of the front wheels travels between said pair of guide members of each front wheel guide unit and as each of the rear wheels travels between said pair of guide members of each rear wheel guide unit, and wherein said first and said second position adjusting mechanisms can adjust at least the interval between each pair of guide members and the wheel track of the vehicle wheel guide units independently of the front wheel guide units based on the time of passage detected by said detection means. Preferably, each pair of guide members is moved towards the side of a particular tire on either side thereof such that each pair of guide members can maintain an interval therebetween in accordance with the width of the tire.

In accordance with the vehicle positioning apparatus of the invention, instead of taking necessary measures for positioning a vehicle that is placed on equipment in a stationary manner, the vehicle is positioned as it moves within the apparatus (namely, during the process of the front wheels traveling between a pair of guide members of each front wheel guide unit and the rear wheels traveling between a pair of guide members of each rear wheel guide unit), which is one of the major features of the invention. Because the vehicle is positioned while moving, the elastic deformation of the tires or the development of histeresis in and around the legs of the vehicle, which occurs in conventional apparatuses, can be prevented. As a result, the vehicle can be positioned with very high accuracy. Further, because each tire is restrained on either side by a pair of guide members of each wheel guide unit as the vehicle moves, a highly accurate positioning of the vehicle can be ensured.

In accordance with the invention, the interval between each pair of guide members of each wheel guide unit can be adjusted by a first position adjusting mechanism, and the interval between each pair of wheel guide units can be adjusted by a second position adjusting mechanism. Thus, vehicles with different tire widths or different wheel tracks can be positioned with the same apparatus by appropriately adjusting the first and the second position adjusting mechanisms.

The vehicle positioning apparatus of the invention includes a detection means disposed between the front wheel guide units and the rear wheel guide units for detecting the time at which the front wheels of the vehicle pass the detection means as the vehicle is introduced. Based on the time of passage thus detected by the detection means, the interval between each pair of guide members in the rear wheel guide units and the wheel track of the rear wheel guide units can be adjusted independently of the front wheel guide units. As a result, vehicles with different tire widths or wheel tracks for the front wheels and rear wheels can be correctly positioned with the same apparatus.

In a preferred embodiment, the first and said second position adjusting mechanisms each include a memory unit for storing data about the tire width and the wheel track of each vehicle that is introduced, wherein the interval between each pair of guide members and the interval between each pair of wheel guide units are adjusted for each vehicle to be positioned on the basis of said data stored in said memory unit.

In this embodiment, data about the tire widths and wheel tracks for a number of types of vehicles is stored in the memory unit. Data for a particular type of vehicle can be taken out of the memory unit and then used when the first and the second position adjusting mechanisms make required adjustments. In this way, various types of vehicles can be positioned continuously, thereby helping to achieve higher efficiency.

The manner in which the vehicle is set on the vehicle positioning apparatus of the invention is not particularly limited. In one example, the front wheel guide units and the rear wheel guide units are both adjusted in accordance with the tire width and the wheel track of the front wheels of the vehicle that is introduced. The vehicle is then advanced into the apparatus towards the front wheel guide units via the rear wheel guide units. When the front wheels pass through the rear wheel guide units and are detected by the detection means, the rear wheel guide units are adjusted in accordance with the tire width and wheel track of the rear wheels of the vehicle. Thereafter, the front wheels travel on the front wheel guide units and the rear wheels travel on the rear wheel guide units a predetermined distance, whereby the vehicle can be positioned naturally with high accuracy.

In accordance with the vehicle positioning apparatus of the invention, the vehicle is positioned with each of the tires of the vehicle restrained by the guide members, which are bar-shaped, on either side as the vehicle is moved. Thus, the vehicle can be positioned with high accuracy. Preferably, by appropriately controlling each of the wheel guide units with reference to a database storing information about the tire widths and wheel tracks of vehicles, various types of vehicles can be handled with a single apparatus.

DESCRIPTION OF PREFERRED
EMBODIMENTS OF THE INVENTION

Figure 1:
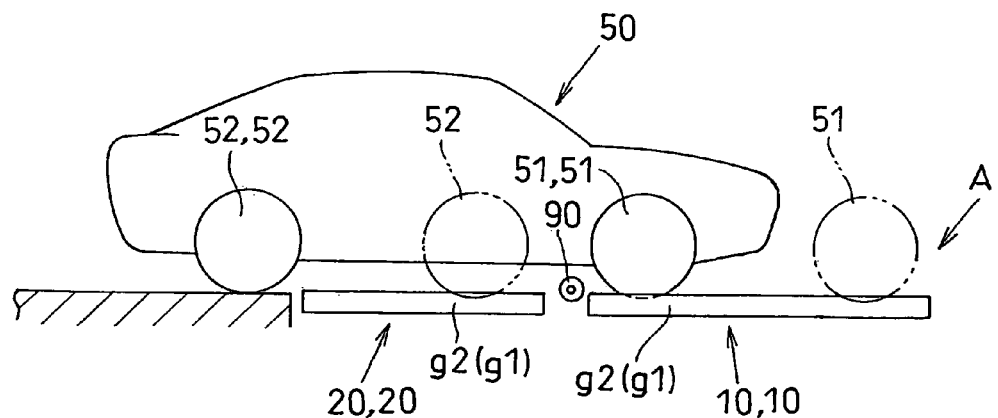
FIG. 1 schematically shows a side view of a vehicle positioning apparatus according to the invention.
Figure 2:
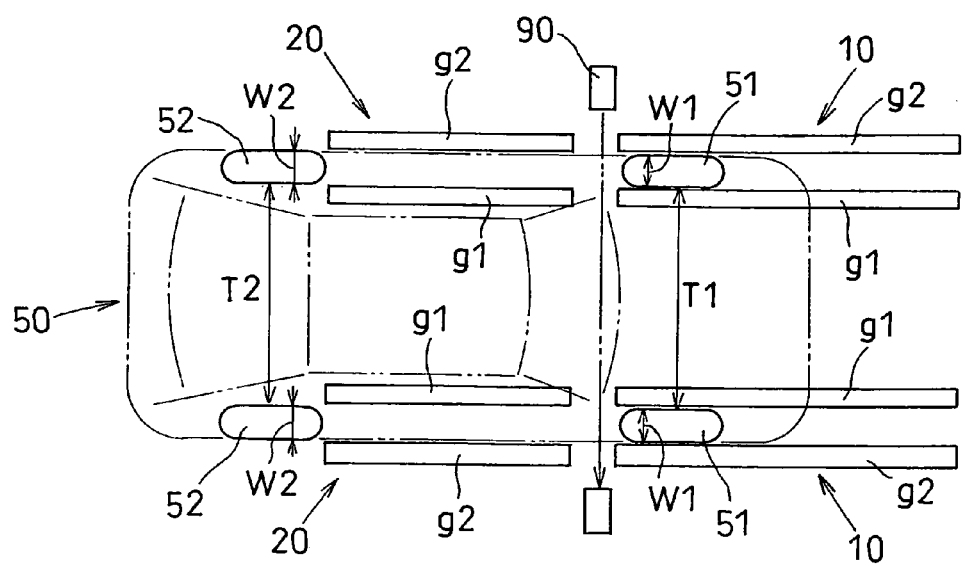
FIG. 2 schematically shows a plan view of the vehicle positioning apparatus of the invention.
Figure 3:
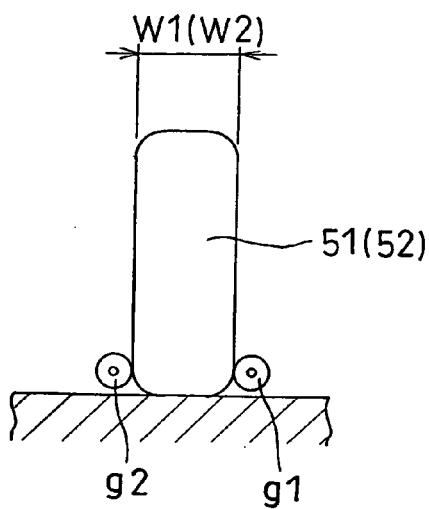
FIG. 3 shows a tire of a vehicle being restrained on either side in the vehicle positioning apparatus, with FIG. 3(a) showing a front view and FIG. 3(b) showing a side view.
Figure 3:
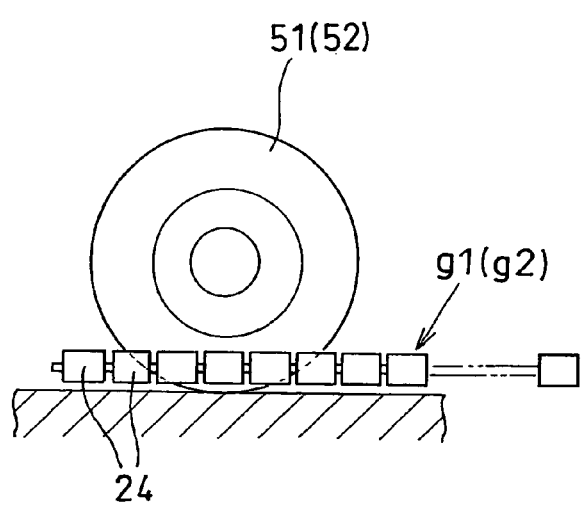
Figure 4:
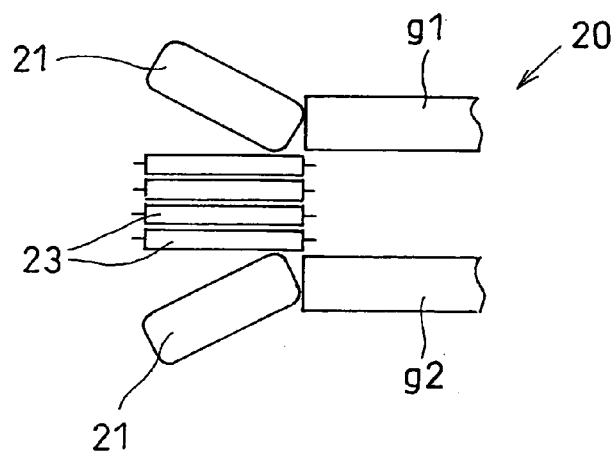
FIG. 4 shows a mode of operation of a rear wheel guide unit on the vehicle entry side thereof.
Figure 5:
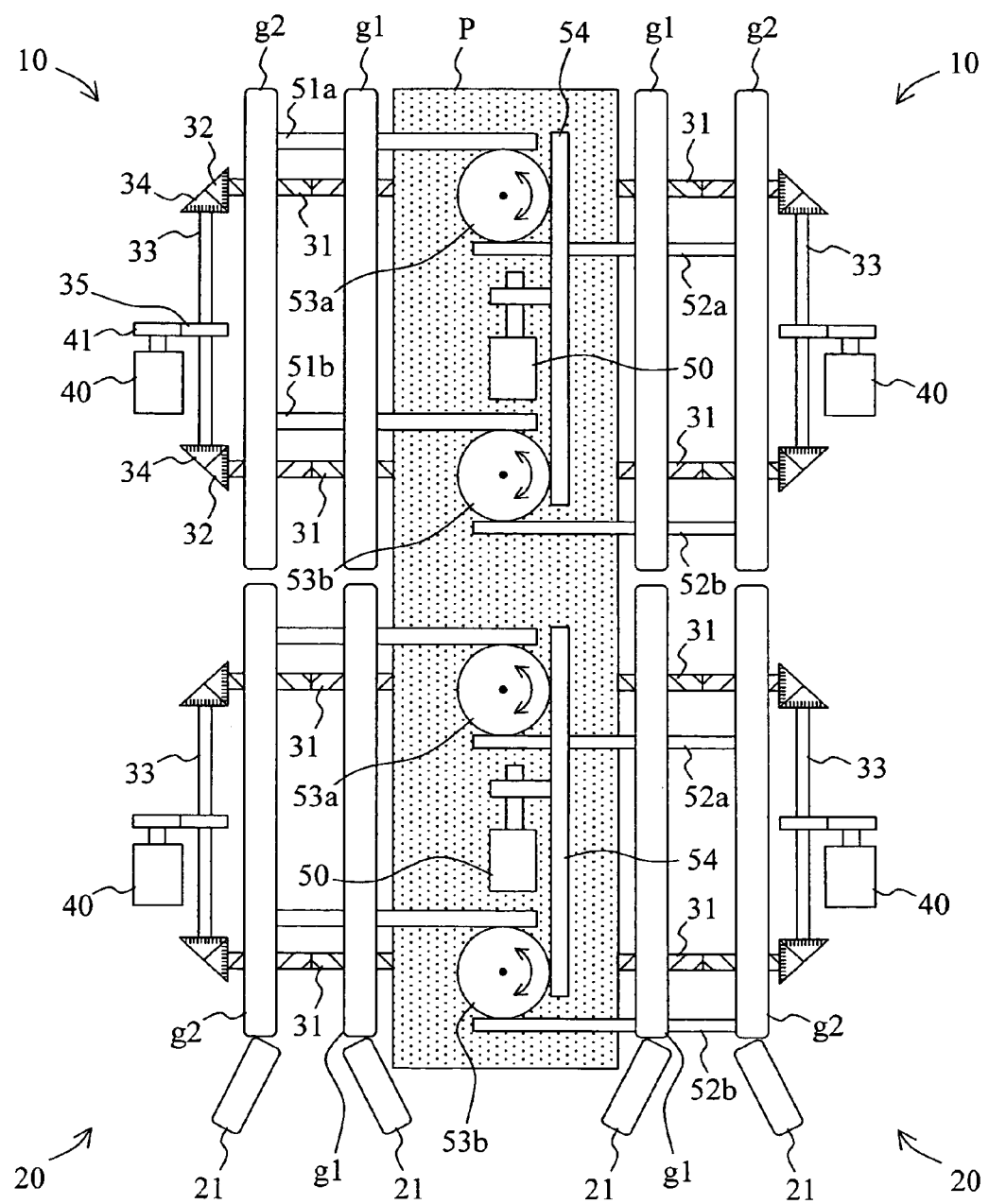
FIG. 5 shows an example of an adjustment mechanism in each of the wheel guide units of which the vehicle positioning apparatus of the invention is comprised.
Figure 6:
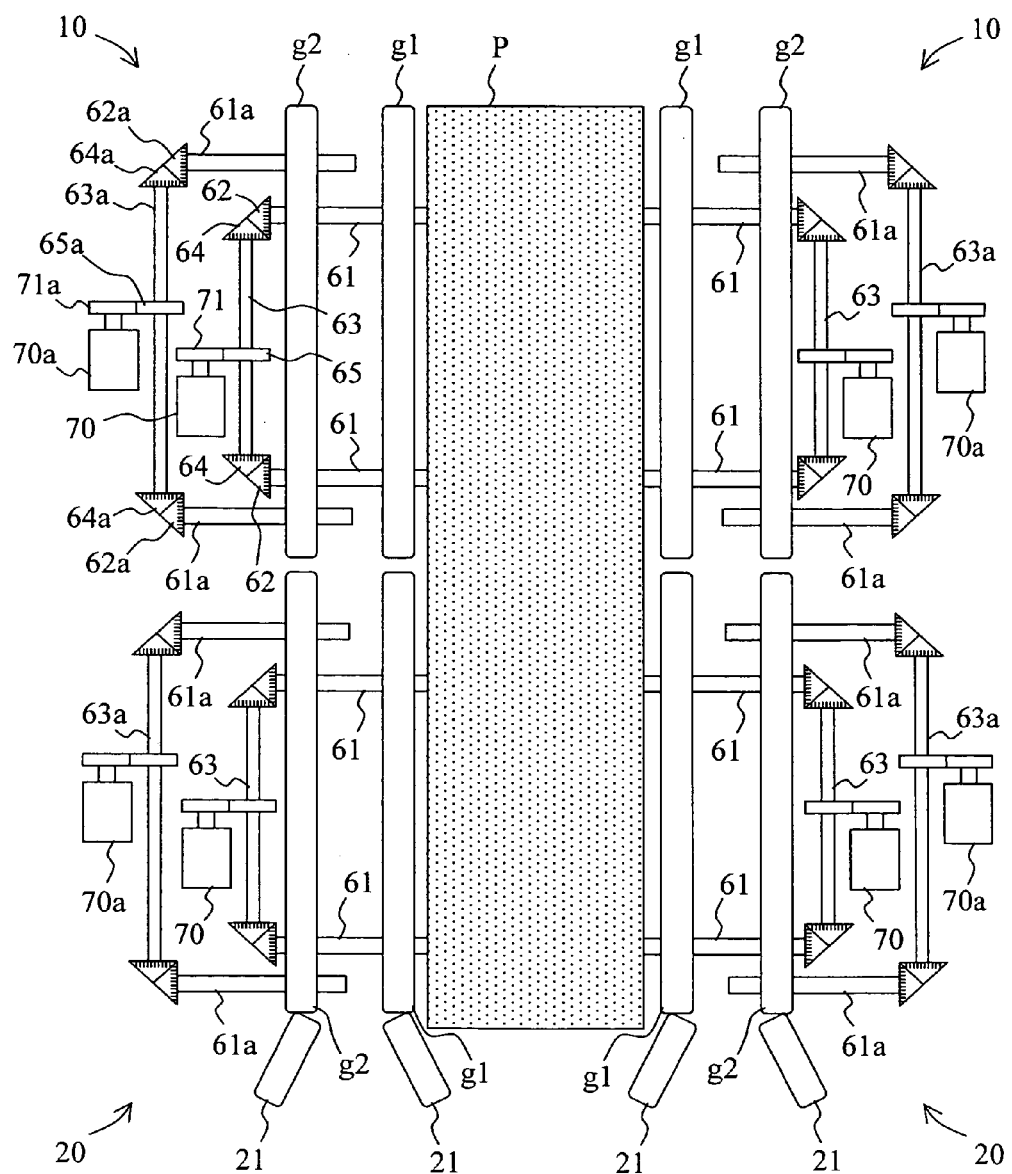
FIG. 6 shows another example of the adjustment mechanism in each of the wheel guide units.
Figure 7:
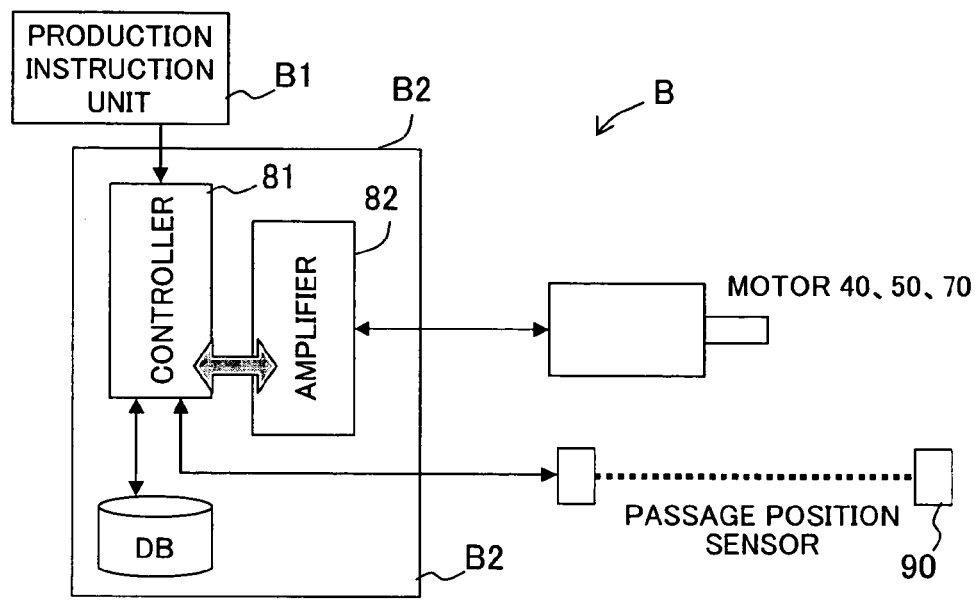
FIG. 7 shows an example of a control unit.
Figure 8:
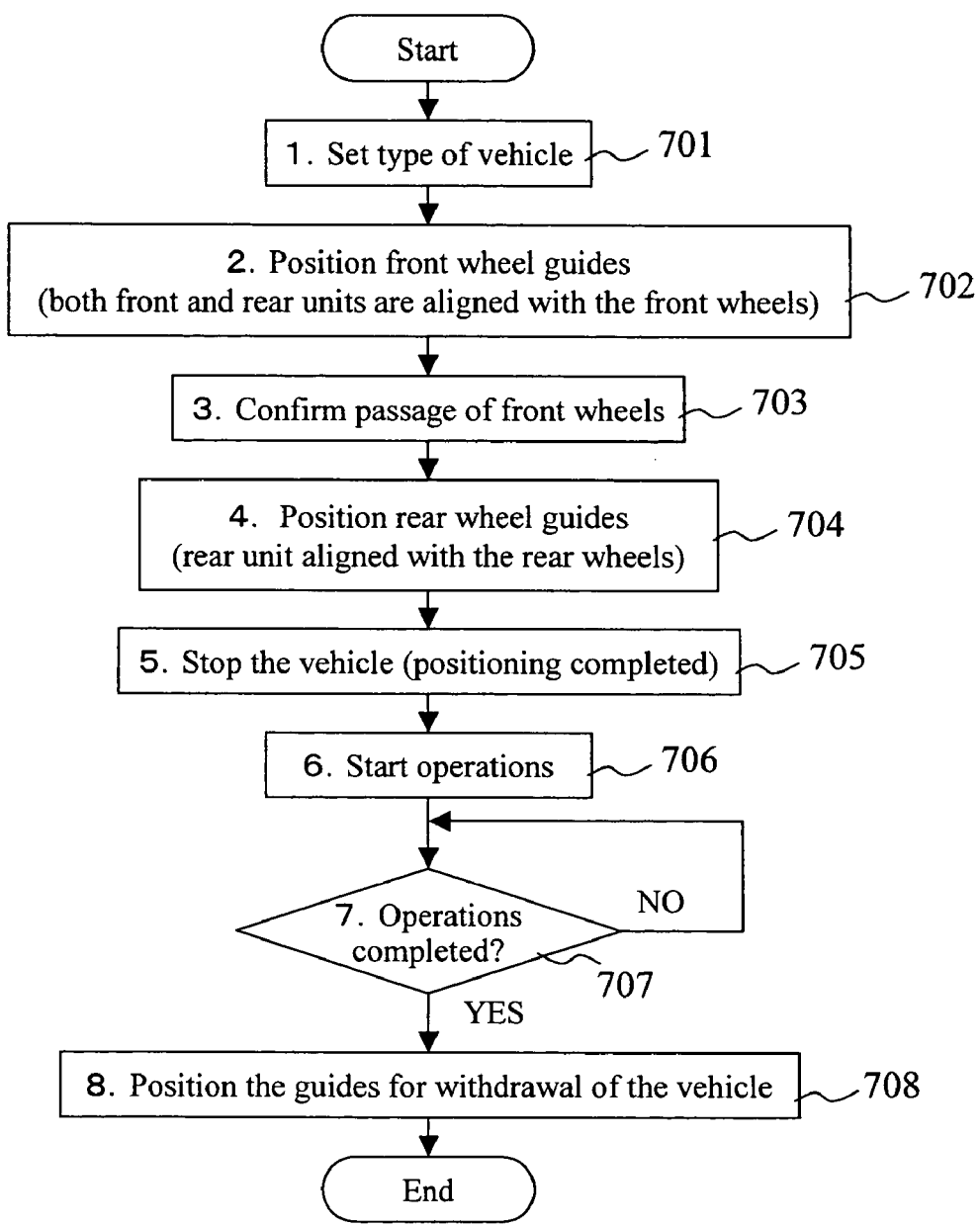
FIG. 8 shows a flowchart of a control process.

The embodiments of the invention will be hereafter described with reference to the drawings. FIG. 1 shows a schematic side view of a vehicle, with reference to which the vehicle positioning apparatus of the invention will be described. FIG. 2 shows a schematic plan view. FIG. 3 shows vehicle tires as they are held on either side thereof using the vehicle positioning apparatus. FIG. 3(a) shows a front view, and FIG. 3(b) is a side view. FIG. 4 shows a mode of operation on the vehicle-entry side of a rear-wheel guide unit. FIG. 5 shows an example of an adjustment mechanism in each of a plurality of wheel guide units of which the vehicle positioning apparatus is comprised. FIG. 6 shows another example of the adjustment mechanism in each wheel guide unit. FIG. 7 shows an example of a control unit. FIG. 8 shows an example of a control flowchart.

A vehicle positioning apparatus A illustrated in the drawings includes two wheel guide units 10 for the front wheels, and two wheel guide units 20 for the rear wheels. Each of the wheel guide units has substantially identical structure, including pairs of longitudinal guide members, namely, inner guide members g1 and outer guide members g2, that extend in parallel and that have a predetermined length. As shown in FIGS. 1 and 2, the two front wheel guide units 10 are disposed in parallel and spaced apart from one another by wheel track T1 of front wheels 51 of a vehicle 50. Similarly, the two rear wheel guide units 20 are disposed rearwardly of the two front wheel guide units 10 in parallel and spaced apart from one another by wheel track T2 of rear wheels 52 of the vehicle 50. Between the front wheel guide units 10 and the rear wheel guide units 20, there is disposed a position sensor 90, for example, as a means for detecting the time of passage of the front wheels 51 of the vehicle 50.

The length of the inner guide member g1 and the outer guide member g2 of each of the wheel guide units 10 and 20 is set to be such a length that, when the front wheels 51 of the vehicle 50 have entered the front wheel guide units 10 and the rear wheels 52 have entered the rear wheel guide units 20, the vehicle can travel a predetermined distance (such as about 1 to 3 m). In the example shown in FIG. 1, as indicated by the solid lines, the front wheels 51 of the vehicle 50 are in the front wheel guide units 10, but the rear wheels 52 are not yet in the rear wheel guide units 20. In this state, the position of the rear wheel guide units 20 are adjusted to be aligned with tire width W2 and wheel track T2 of the rear wheels 52, as will be described later.

The vehicle 50 is then further advanced until the rear wheels 52 are also in the rear wheel guide units 20, whereupon the vehicle travels the predetermined distance as mentioned above while maintaining the posture, whereby a correct position of the vehicle 50 can be ensured. Optionally, guide members 21 for guiding the wheels of an advancing vehicle may be provided at the entry portion of the rear wheel guide units 20, the guide members 21 being adapted to open in V-shape, as shown in FIG. 4. Further, a plurality of rollers 23 may be arranged between the guide members 21 with the axes of the rollers 23 aligned with the direction of entry of the vehicle. In this way, smooth entry of the vehicle 50 can be ensured.

The inner guide members g1 and the outer guide members g2 of the wheel guide units 10 and 20 run in parallel while a distance is maintained therebetween that is substantially the same as the tire widths W1 or W2 of the front wheels 51 or the rear wheels 52 of the vehicle 50. As shown in FIG. 3(a), the inner guide members g1 and the outer guide members g2 are preferably disposed such that each tire can be held on both sides slightly above the tread of the tire. As each of the wheels travels a predetermined distance between the thus disposed guide members g1 and g2, the vehicle can be correctly positioned with high accuracy without producing elastic deformation of the tires or the development of histeresis in and around the legs. In order to reduce the friction between the guide members g1 and g2 and each of the tires, cylindrical members 24 may be rotatably attached to each of the guide members g1 and g2 via appropriate bearings (not shown), as shown in FIG. 3b.

When the positioning involves a single type of vehicles 50, intended purposes could be achieved with a vehicle positioning apparatus having wheel guide units 10 and 20 adapted to the tire width and wheel track of the particular type of vehicle, as mentioned above. However, for vehicles with various tire widths and wheel tracks, such a system cannot be used. Therefore, as shown in FIG. 5, the distance (interval) between the inner guide member g1 and the outer guide member g2 of each of the wheel guide units 10 and 20 is made adjustable in accordance with the tire width using a first position adjusting mechanism based on a servo mechanism, for example. Further, the distance between the two front wheel guide units 10 and the distance between the two rear wheel guide units 20 are made adjustable in accordance with the wheel track using a second position adjusting mechanism, also based on a servo mechanism, for example. In this way, various types of vehicles can be handled with the same apparatus.

In the apparatus shown in FIG. 5, the guide members g1 and g2, of which each of the wheel guide units 10 (20) is comprised, are in threaded engagement with two ball screws 31 disposed in parallel. The ball screws 31 are each threaded in opposite directions on either end. At the tip of each of the two ball screws 31 is mounted a bevel gear 32. Each bevel gear 32 is engaged with another bevel gear 34 disposed at either end of a rotation axle 33. The rotation axle 33 has a gear 35 fixed thereto, which is engaged with another gear 41 fixed to the rotation axle of a motor 40. These components comprise the first position adjusting mechanism.

Each of the wheel guide units 10 (20) consists of the same mechanism. By controlling the motors 40 of the two front wheel guide units 10 using a servo mechanism, the distance between the guide members g1 and g2 can be adjusted towards each tire from both sides thereof simultaneously and laterally equally. The distance between the guide members g1 and g2 of the two rear wheel guide units 20 can also be adjusted in the same manner. These adjustments are made in accordance with both the tire width W1 of the front wheels 51 and the tires width W2 of the rear wheels 52 of the vehicle 50 to be positioned.

With reference to FIG. 5, the adjustment mechanism (second position adjusting mechanism) for the wheel tracks T1 and T2 using the apparatus shown in FIG. 5 is described. Each of the two wheel guide units 10 includes a pair of racks 51a and 51b and another pair of racks 52a and 52b, which are all disposed in parallel and extend inwards and onto a pit region P. Between the two racks 51a and 52a oppositely disposed forwardly, there is disposed a pinion 53a engaged with both racks. Similarly between the two racks 51b and 52b oppositely disposed rearwardly, there is disposed a pinion 53b engaged with both racks. The two pinions 53a and 53b are engaged with a second rack 54, which is moved by the rotation of the motor 50 in forward and backward directions (along the guide members g1 and g2). In this structure, as the motor 50 rotates, the two wheel guide units 10 are moved, via the second rack 54, pinions 53a and 53b, and the racks 51a and 51b, laterally equally in a direction such that the distance between the two wheel guide units 10 can be either increased or decreased. The same mechanism is provided in the two rear wheel guide units 20.

In this structure, by controlling each of the driving motors 50 provided in each of the mechanisms using a servo mechanism or the like, the distance between the two front wheel guide units 10, and the distance between the two rear wheel guide units 20 can be independently adjusted. By making such adjustments in accordance with the wheel track T1 of the front wheels and the wheel track T2 of the rear wheels of the vehicle 50 to be positioned, various types of vehicles can be positioned using the same apparatus.

An example of the operation of the above-described apparatus is described. As a means of controlling the first and the second position adjusting mechanism, a control unit B shown in FIG. 7 is used. The control unit B includes a production instruction unit B1 in which operation instructions are stored, and a computer B2. The computer B2 includes: a database (memory unit) DB storing information regarding the tire widths and wheel tracks for many types of vehicles; a controller 81 for calculating a necessary motion instruction to be given to each motor based on a comparison of the current situation of each of the wheel guide units and information supplied from the database (memory unit), and creating an activating instruction and a terminating instruction to be delivered to each motor based on information detected from the aforementioned position sensor 90; and an amplifier 82 for causing the motors 40 and 50 to be activated or terminated in accordance with the instruction from the controller 81.

With reference to FIG. 8, an example of a control flow is described. First, the operator sets the type of vehicle in accordance with production instructions (step 701). Information regarding the type of vehicle is then delivered to computer B2. The control unit 81 acquires information regarding the tire widths W1 and W2 and wheel tracks T1 and T2 of the relevant vehicle 50 from the database DB. The control unit 81 also adjusts the interval between the guide members g1 and g2 of each of the four wheel guide units 10 and 20 in accordance with the front tire width W1 and wheel track T1 of the vehicle. The control unit 81 further feeds a signal to the amplifier 82 for adjusting the interval between the front wheel guide units 10 and that between the rear wheel guide units 20. The amplifier 82 then drives the motors 40 and 50 as required so as to correctly position the wheel guide units 10 and 20 (step 702).

The operator then advances the vehicle 50 such that the front wheels 51 enter the rear wheel guide units 20. The position sensor 90 detects the passage of the front wheels 51 of the vehicle 50, and outputs a detection signal to the control unit 81 (step 703). At this point, the vehicle is in a state as shown in FIGS. 1 and 2.

The controller 81, after receiving the signal from the position sensor 90, feeds a signal to the amplifier 82 such that the rear wheel guide units 20 are adjusted to the tire width W2 and wheel track T2 of the vehicle rear wheels 52. The amplifier 82 drives the individual motors 40 and 50 as required so as to position the rear wheel guide unit 20 (step 704). In this state, the operator further advances the vehicle 50 forward until the front wheels 51 are positioned on the front wheel guide units 10 and the rear wheels 52 are positioned within the rear wheel guide units 20. The vehicle 50 is further advanced with the tires 51 and 52 restrained on both sides by the guide members g1 and g2 until the vehicle 50 travels a predetermined distance, whereupon an accurate position of the vehicle is achieved (step 705).

In this position, the operator starts working on required operations, such as checking the transmission direction of a millimeter wave radar in a lane-keeping system or other mounted sensors (step 706). After confirming the completion of operations (step 707), the operator sets the front and rear wheel guide units 10 and 20 for vehicle exiting positions, and lets the vehicle exit (step 708). If there is another vehicle of the same type that needs to be positioned, the same process is repeated from step 703. If a vehicle of a different type is to be positioned, the process is repeated from step 701. In this way, different types of vehicles can be positioned continuously.

FIG. 6 shows another example of the vehicle positioning apparatus. This example differs from the adjusting mechanism shown in FIG. 5 in that each of the guide members g1 and g2 in each of the wheel guide units 10 and 20 is fitted with a parallel transfer mechanism consisting of a ball screw and a bevel gear. Specifically, each inner guide member g1 is in threaded engagement with two ball screws 61 that are disposed in parallel. Each ball screw 61 is fitted with a bevel gear 62 at the tip thereof. The two bevel gears 62 are engaged with bevel gears 64 disposed at either end of a rotation axle 63. The rotation axle 63 has a gear 65 fixed thereon which is engaged with a gear 71 fixed on a rotation axle of a motor 70. The same mechanism is provided for each outer guide member g2, of which components with the same functions are designated with the same reference numerals with an "a" added thereto (e.g., 61a, 62a, 63a, 64a, 65a, 70a and 71a).

Thus, as one motor 70 rotates, the inner guide member g1 is moved in the lateral direction, and as the other motor 70a rotates, the outer guide member g2 is moved in the lateral direction in parallel with the inner guide member g1. By controlling the amount and direction of rotation of the two motors 70 and 70a using an appropriate control mechanism, the position of each wheel guide unit 10 (20) with respect to a reference line can be changed, as well as the interval between the guide members g1 and g2 in each wheel guide unit 10 (20) can be adjusted as needed. Therefore, by appropriately controlling these adjustments for the four wheel guide units 10 and 20, adjustments can be made independently for: the interval between the guide members g1 and g2 (which are driven such that they become closer to each tire from either side) in accordance with the tire width W1 for the front wheels and the tire width W2 for the rear wheels of the vehicle 50 to be positioned; the interval between the two front wheel guide units 10 in accordance with the front wheel track T1; and the interval between the two rear wheel guide units 20 in accordance with the rear wheel track T2 of the vehicle 50. By making such adjustments, various types of vehicles can be positioned using the same apparatus as shown in FIG. 5.

The above-described first and second position adjusting mechanisms are only exemplary, and it goes without saying that there may be other kinds of position adjusting mechanisms capable of making adjustments for the tire widths and wheel tracks in each wheel guide unit. Therefore, it should be obvious that the scope of the invention is not limited to the two adjustment mechanisms that have been described in the foregoing.

What is claimed is:

1. A vehicle positioning apparatus for ensuring a correct position of a vehicle by introducing said vehicle into said apparatus, comprising:

front and rear wheel guide units each comprising a pair of guide members with a predetermined length that extend in parallel on either side of each tire of said vehicle that is introduced, while an interval is maintained between said guide members in accordance with the width of the tire;

a first position adjusting mechanism for adjusting the interval between each pair of guide members in each wheel guide unit in accordance with the tire width of said vehicle that is introduced;

a second position adjusting mechanism for adjusting the interval between each pair of said wheel guide units in accordance with the wheel track of said vehicle that is introduced; and a detection means disposed between said rear wheel guide units and said front wheel guide units for detecting the timing at which the front wheels of said vehicle pass said detection means as said vehicle is introduced, wherein the front wheels of said vehicle are introduced into said front wheel guide unit after passing through said rear wheel guide unit, wherein said vehicle is correctly positioned as each of the front wheels travels between each pair of guide members of each front wheel guide unit and as each of the rear wheels travels between each pair of guide members of each rear wheel guide unit, and wherein said first and said second position adjusting mechanisms can adjust the interval between each pair of guide members of said rear wheel guide units as well as the wheel track thereof independently of the front wheel guide units, based on the time of passage detected by said detection means.

2. The vehicle positioning apparatus according to claim 1, wherein each pair of said guide members is moved towards the side of a particular tire on either side thereof such that each pair of guide members can maintain an interval therebetween in accordance with the width of the tire.

3. The vehicle positioning apparatus according to claim 1 or 2, wherein said first and said second position adjusting mechanisms each include a memory unit for storing data about the tire width and the wheel track of each vehicle that is introduced, wherein the interval between each pair of guide members and the interval between each pair of wheel guide units are adjusted for each vehicle to be positioned, on the basis of said data stored in said memory unit.

* * * * *